United States Patent
Duanmu et al.

(10) Patent No.: US 11,956,295 B2
(45) Date of Patent: Apr. 9, 2024

(54) CLIENT-END ENHANCED VIEW PREDICTION FOR MULTI-VIEW VIDEO STREAMING EXPLOITING PRE-FETCHED DATA AND SIDE INFORMATION

(71) Applicant: Apple Inc., Cupertino, CA (US)

(72) Inventors: Fanyi Duanmu, Cupertino, CA (US); Alexandros Tourapis, Milpitas, CA (US); Jun Xin, Sunnyvale, CA (US); Hsi-Jung Wu, San Jose, CA (US); Xiaosong Zhou, Campbell, CA (US)

(73) Assignee: APPLE INC., Cupertino, CA (US)

( * ) Notice: Subject to any disclaimer, the term of this patent is extended or adjusted under 35 U.S.C. 154(b) by 391 days.

(21) Appl. No.: 16/825,381

(22) Filed: Mar. 20, 2020

(65) Prior Publication Data
US 2021/0099507 A1    Apr. 1, 2021

Related U.S. Application Data

(60) Provisional application No. 62/906,856, filed on Sep. 27, 2019.

(51) Int. Cl.
*H04L 65/75*    (2022.01)
*H04L 65/70*    (2022.01)
(Continued)

(52) U.S. Cl.
CPC ............ *H04L 65/764* (2022.05); *H04L 65/70* (2022.05); *H04N 13/111* (2018.05);
(Continued)

(58) Field of Classification Search
CPC .............. H04L 65/604; H04L 65/4092; H04L 67/2847; H04L 65/764; H04L 65/70;
(Continued)

(56) References Cited

U.S. PATENT DOCUMENTS

| 7,091,928 B2 | 8/2006 | Rajasingham et al. |
| 8,184,069 B1 | 5/2012 | Rhodes |

(Continued)

FOREIGN PATENT DOCUMENTS

| EP | 3459247 A1 * | 3/2019 | ........... H04L 65/601 |
| GB | 2557416 A | 6/2018 | |

(Continued)

OTHER PUBLICATIONS

Corbillon et al.; "Viewport-Adaptive Navigable 360-Degree Video Delivery"; ACM MMYSys; May 2016; 58 pages.

(Continued)

*Primary Examiner* — Caroline H Jahnige
(74) *Attorney, Agent, or Firm* — BakerHostetler

(57) ABSTRACT

Techniques for multi-view video streaming are described in the present disclosure, wherein a viewport prediction may be employed at a client-end based on analysis of pre-fetched media item data and ancillary information. A streaming method may first prefetch a portion of content of a multi-view media item. The method may next identify a salient region from the prefetched content and may then download additional content of the media item that corresponds to the identified salient region.

4 Claims, 5 Drawing Sheets

(51) Int. Cl.
*H04N 13/111* (2018.01)
*H04N 13/161* (2018.01)
*H04N 13/194* (2018.01)
*H04N 13/344* (2018.01)

(52) U.S. Cl.
CPC ......... *H04N 13/161* (2018.05); *H04N 13/194* (2018.05); *H04N 13/344* (2018.05)

(58) Field of Classification Search
CPC ... H04L 65/612; H04L 65/613; H04L 65/756; H04L 65/80; H04N 21/4728; H04N 21/8456; H04N 19/167; H04N 21/234327; H04N 21/2662; H04N 21/4621; H04N 21/233; H04N 5/232945; H04N 13/111; H04N 13/161; H04N 13/194; H04N 13/344
See application file for complete search history.

(56) References Cited

U.S. PATENT DOCUMENTS

| | | |
|---|---|---|
| 9,940,518 B1 | 4/2018 | Klingstrom et al. |
| 10,419,738 B1 | 9/2019 | Phillips et al. |
| 2004/0136590 A1 | 7/2004 | Brouwer |
| 2004/0207635 A1 | 10/2004 | Miller et al. |
| 2008/0181498 A1 | 7/2008 | Swenson et al. |
| 2014/0199043 A1 | 7/2014 | Guntur et al. |
| 2015/0156520 A1 | 6/2015 | Thakkar et al. |
| 2015/0288923 A1 | 10/2015 | Kim et al. |
| 2016/0012855 A1 | 1/2016 | Krishnan |
| 2016/0103907 A1 | 4/2016 | Bingham et al. |
| 2016/0133201 A1 | 5/2016 | Border et al. |
| 2016/0352791 A1 | 12/2016 | Adams et al. |
| 2017/0223083 A1 | 8/2017 | Maze et al. |
| 2017/0251204 A1* | 8/2017 | Gupte ................. H04N 19/597 |
| 2017/0280126 A1 | 9/2017 | Van der Auwera et al. |
| 2017/0324951 A1 | 11/2017 | Raveendran et al. |
| 2017/0339415 A1 | 11/2017 | Wang et al. |
| 2017/0347026 A1 | 11/2017 | Hannuksela |
| 2018/0004285 A1 | 1/2018 | Castleman |
| 2018/0213202 A1* | 7/2018 | Kopeinigg ........... H04N 13/161 |
| 2018/0341323 A1 | 11/2018 | Mate et al. |
| 2019/0174125 A1 | 6/2019 | Ninan |
| 2019/0356894 A1 | 11/2019 | Oh et al. |
| 2019/0373391 A1* | 12/2019 | Han ................. H04N 21/21805 |
| 2019/0379875 A1* | 12/2019 | Gopalakrishnan ... H04N 13/161 |
| 2019/0387224 A1 | 12/2019 | Phillips et al. |
| 2020/0045285 A1* | 2/2020 | Varerkar .............. H04N 19/597 |
| 2020/0149864 A1 | 5/2020 | Kinrot et al. |
| 2020/0374506 A1* | 11/2020 | Petrangeli ........... H04N 13/194 |
| 2020/0382764 A1* | 12/2020 | Oyman ............ H04N 21/44218 |
| 2020/0404241 A1* | 12/2020 | Han .......................... G06T 9/40 |
| 2021/0112193 A1* | 4/2021 | Ter .......................... G06V 10/25 |

FOREIGN PATENT DOCUMENTS

| | | |
|---|---|---|
| WO | WO 2017/188714 A1 | 11/2017 |
| WO | WO 2017/205794 A1 | 11/2017 |
| WO | WO 2018/011054 A1 | 1/2018 |
| WO | WO 2018/049221 A1 | 3/2018 |
| WO | 2018/136301 A1 | 7/2018 |

OTHER PUBLICATIONS

International Patent Application No. PCT/US2019/060238; Invitation to Pay Add'l Fees; dated Mar. 26, 2020; 31 pages.
International Patent Application No. PCT/US2019/060238; Int'l Search Report and the Written Opinion; dated Jul. 3, 2020; 19 pages.
International Patent Application No. PCT/US2019/060238; Int'l Written Opinion; dated Oct. 30, 2020; 12 pages.
Li et al., "Very Long Term Field of View Prediction for 360-degree Video Streaming", Department of Electrical and Computer Engineering, Tandon School of Engineering, New York University, Brooklyn, NY 11201, Feb. 4, 2019, 6 pages.
International Patent Application No. PCT/US2019/060238; Int'l Preliminary Report on Patentability; dated Feb. 4, 2021; 24 pages.

* cited by examiner

100

200

300

400

500

600

700

ND ENHANCED VIEW
CLIENT-END ENHANCED VIEW PREDICTION FOR MULTI-VIEW VIDEO STREAMING EXPLOITING PRE-FETCHED DATA AND SIDE INFORMATION

CROSS REFERENCE TO RELATED APPLICATION

This application claims the benefit of U.S. Provisional Application No. 62/906,856 filed on Sep. 27, 2019, the disclosure of which is incorporated by reference herein.

BACKGROUND

The present disclosure relates to streaming of omnidirectional video, in particular, to techniques for streaming 360° content of a multi-view media item based on a viewport determined at client-end.

Capturing and streaming of multi-view content allows for an immersive viewing experience, wherein content is delivered to a viewer according to its viewing perspective. Typically, such virtual reality experience is accomplished by a headset media display that tracks the viewer's head and/or gaze motions. However, streaming 360° content that is viewable with three degrees of freedom (3DoF) (or six-degrees of freedom (6DoF)—where in addition to viewing content according to the viewer's rotational motion, content may also be viewed according to the viewer's translational motion) requires large amount of bandwidth and computational resources for rendering.

DETAILED DESCRIPTION

Techniques for multi-view video streaming are described in the present disclosure, wherein a viewport prediction may be employed at a client-end based on analysis of pre-fetched media item data and ancillary information. In an aspect, a streaming method may first prefetch a portion of content of a multi-view media item. The method may then identify a salient region from the prefetched content. Following identification, additional content of the media item that corresponds to the identified salient region may be downloaded by the method. In aspects described herein, the prefetched content may be of various representations, such as a base layer, an audio, a depth, a point cloud, or a mesh representation of the multi-view media item. In an aspect, each representation may be used for identifying a salient region, based on which additional content of the media item, with a respective representation at a higher level of detail or a higher visual quality, may be downloaded. In a further aspect, salient regions may be identified using ancillary information, including media item associated metadata, a viewer profile, a viewer personalized information. Furthermore, salient regions may be derived from cross-user correlations of salient regions.

Figure 1:
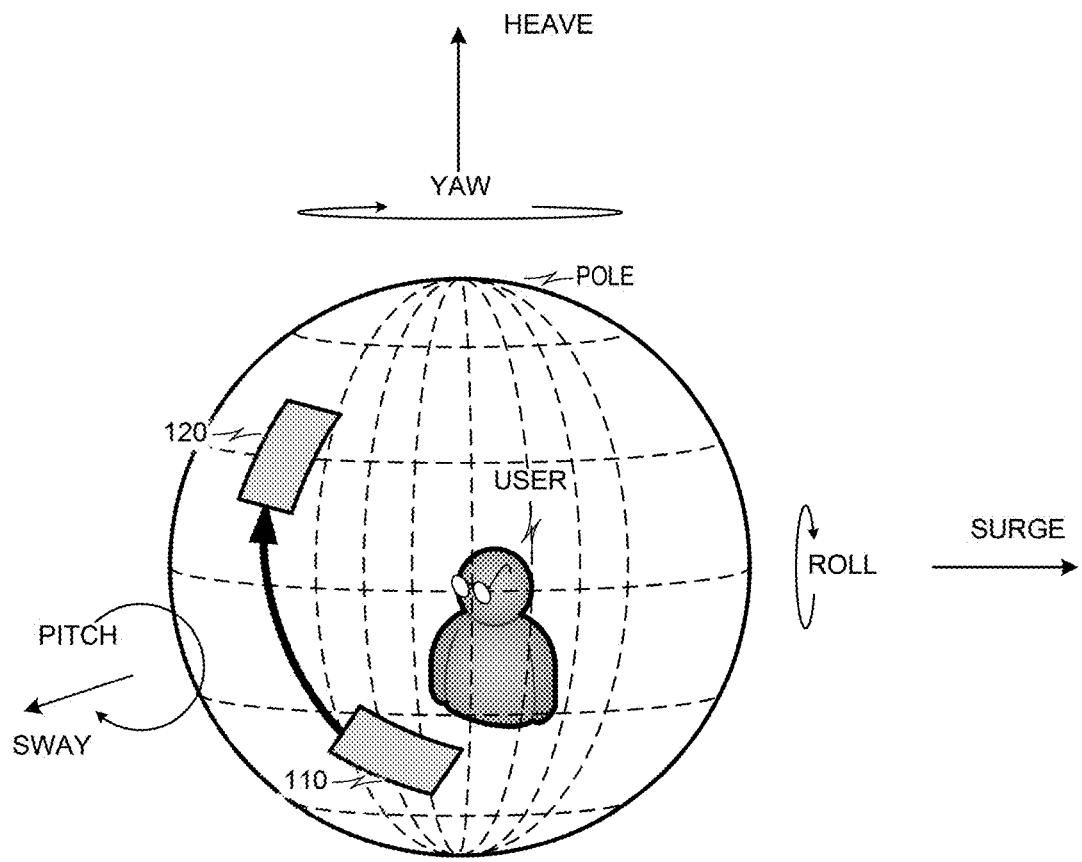
FIG. 1 illustrates an application of multi-view rendering techniques according to an aspect of the present disclosure.

FIG. 1 illustrates an application of multi-view rendering techniques according to an aspect of the present disclosure. Multi-view rendering typically involves presentation of media in a manner that simulates omnidirectional image content, as if the content of the media item occupies an image space 100 that surrounds a user entirely. Typically, the user views the image space 100 through a player device that presents only a sub-part of the image space (called a "viewport," for convenience) at a time. Thus, at one point in time, the user or a rendering application may cause a viewport to be displayed from a first location 110 within the image space 100, which may cause media content from a corresponding location to be presented. At another point in time, the user or the rendering application may shift the viewport to another location 120, which may cause media content from the new location 120 to be presented. The user may shift the location of the viewport as many times as may be desired. When content from one viewport location 110 is presented to the user, content from other location(s) need not be rendered for the user.

Figure 2:
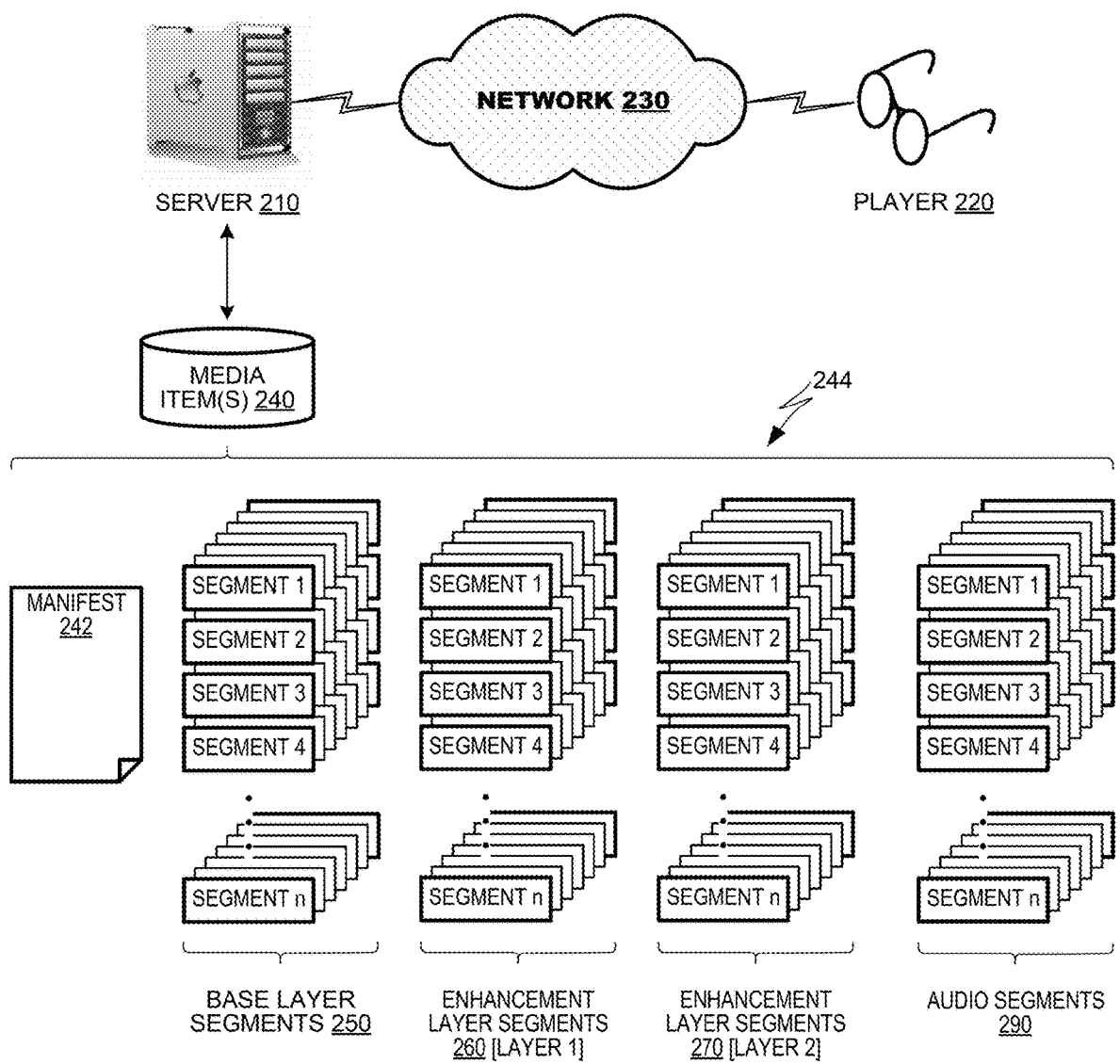
FIG. 2 illustrates a video exchange system according to an aspect of the present disclosure.

FIG. 2 illustrates a video exchange system 200 according to an aspect of the present disclosure. The system 200 may include a server 210 and a player device 220 provided in communication via a network 230. The server 210 may store one or more media items 240 for delivery to the player 220. Thus, the player 220 may request a media item 240 from the server 210 and display it when the server 210 delivers the requested media item.

In an aspect, individual media items 240 and associated information may be stored as a manifest file 242 and a plurality of segments 244. A manifest file 242 may store an index of the segments with respective information, such as data identifying the segments' temporal order in a playback timeline and identifiers of network locations from which the segments may be downloaded. The segments 244 themselves may contain video data of the media item. The segments 244 may be organized to correspond to different spatial portions of a multi-view image space 100 (FIG. 1), to different display times, and to different coding qualities, as explained with reference to FIG. 3.

Figure 3:
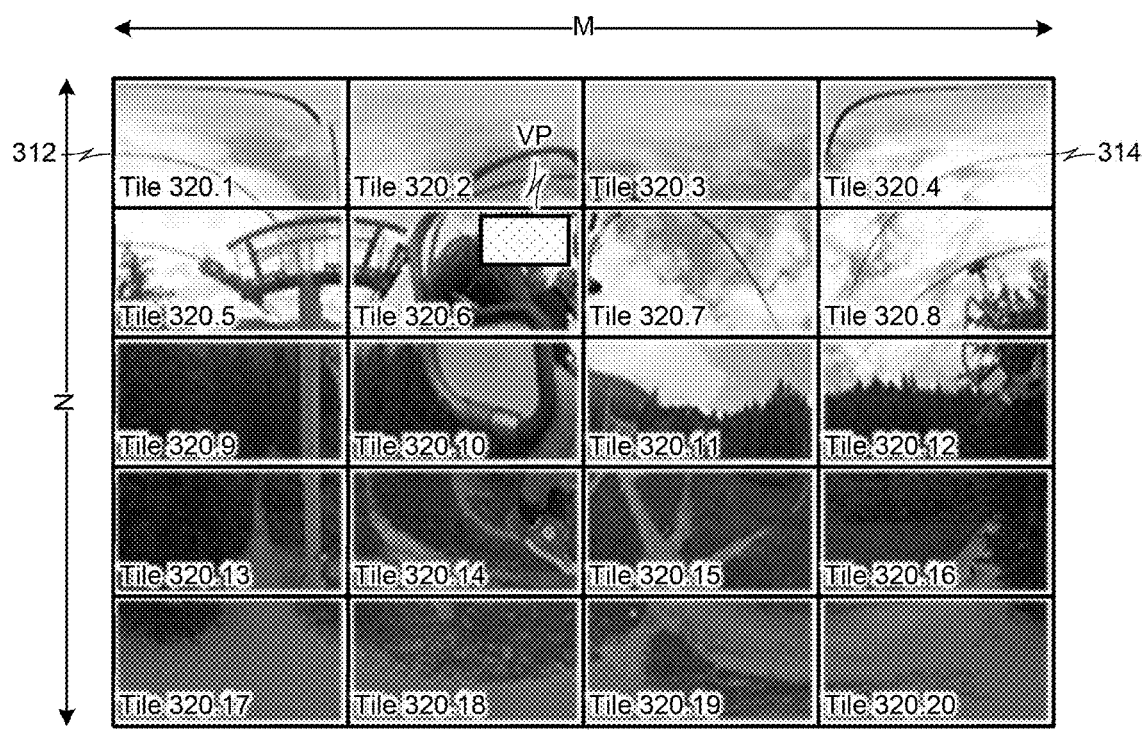
FIG. 3 illustrates an exemplary user interface wherein contact data is supplemented based on content exchanged between terminals according to an aspect of the present disclosure.

FIG. 3 illustrates an exemplary frame 300 representing a multi-view image space. In this example, the frame 300 illustrates omni-directional content contained within a two-dimensional representation of M×N pixels. Content at one edge 312 of the frame 300 is contiguous with content at another edge 314 of the frame 300, which provides continuity in content in the horizontal direction of the frame's image space. The frame 300 may be partitioned into a plurality of tiles 320.1-320.20 that, in aggregate, represent the full content of the frame 300. Although the tiles 320.1-320.20 are shown as having identical sizes as each other, in practice, they need not be so configured. Some tiles may be larger than others, smaller than others, and have different shapes as may be desired.

In an aspect, each tile 320.1-320.20 of a multi-view frame 300 may correspond to an individual segment 244 stored by the server 210. As illustrated in FIG. 2, segment 1 may correspond to a first tile 320.1 in the exemplary frame 300

(FIG. 3), segment 2 may correspond to a second tile 320.2, and so on. Each segment 1, 2, . . . , n, may represent a sequence of coded video at its respective tile's location and, thus, the segment 1 may have coded video information representing content of the tile 320.1 at a temporal instant represented by frame 300 and for other temporal instances of the tile 320.1 at other frames (not shown in FIG. 3). Each segment may store coded video information of a corresponding tile for a predetermined temporal duration (e.g., 5 seconds). The spatial layout of the tiles and correspondence to the segments may be identified in a manifest file 242 for the media item 240.

The media item 240 also may contain other segments (shown in stacked representation) for each of the spatial locations corresponding to segments 1-n at other temporal durations of the media item 240. Thus, there may be a segment 1 representing a tile's content for the first five seconds of a multi-view video, another segment 1 representing the tile's content for the second five seconds of the video, and so on. Each temporal instance of the segment 1 may be downloaded from a server 210 independently of other temporal instance(s) of the segment 1. Similarly, there may be different instances of segment 2, segment 3, . . . , segment n, each of which may correspond to a certain tile content at different temporal instances. A prolonged video of a multi-view space 100 may be developed from the concatenation of segments representing tiles at different temporal instances. The temporal durations of the segments may be identified in the manifest file 242 of the media item 240.

FIG. 2 also illustrates segments 1-n organized into multiple layers. A first set 250 of segments 1-n (called "base layer segments," for convenience) may contain coded video of their corresponding tiles that are coded at a first level of coding quality with a first target bitrate. Typically, the base layer segments 250 represent tile content coded at the lowest bitrate available for the system, albeit at the lowest coding quality. Although not required, oftentimes, it is convenient to define a common target bitrate for all segments within the base layer. The coding rates of the base layer segments 250 may be identified in the manifest file 242 of the media item 240.

Other sets 260, 270 of segments 1-n may contain coded video of their corresponding tiles that are coded according to scalable coding techniques. These other sets of segments are called "enhancement layer segments," for convenience. The enhancement layer segments may contain coded representations of tile video that, when decoded in conjunction with their corresponding base layer segments, may yield higher quality video than would be obtained from decoding the base layer segments alone. In the example of FIG. 2, two sets 260, 270 of enhancement layer segments are shown; the number of sets of enhancement layer segments may be tailored to suit individual application needs. In some use cases, it may be preferred to utilize a single set 260 of enhancement layer segments. In other use cases, it may be preferred to utilize three or more sets of enhancement layer segments (not shown). The principles of the present disclosure find application with any number of sets of enhancement layer segments.

When multiple sets 260, 270 of enhancement layer segments are employed, it is often convenient to code the video of each set according to target bitrates that are defined for each such set. Thus, the first set 260 of enhancement layer segments may be coded according to a first target bitrate, which is expected to provide a first quality increase to video when it is decoded as compared to decoded video obtained solely from a base layer 250. The second set 270 of enhancement layer segments may be coded according to a second target bitrate, which may be higher than the target bitrate of set 260 and would be expected to provide a second, higher quality increase to the decoded video compared to the first set 260 of enhancement layer segments. The coding rates of the enhancement layer segments 260, 270 may be identified in the manifest file 242 of the media item 240.

A server 210 may store segments 290 of coded audio together with media items 240.

Although only one set 290 of audio segments is shown in the example of FIG. 2, it may be convenient to provide multiple sets of audio segments (not shown) to support audio content in different languages, to support different types of audio channels, or to distinguish spoken dialogue from other audio content (e.g., music). The types and coding rates of the audio segments 290 may be identified in the manifest file 242 of the media item 240.

As discussed, segments 250-290 may store compressed representations of their respective video and audio content. During video rendering, a player 220 may review the manifest file 242 of a media item 240, may identify segments that correspond to a desired video content of the multi-view image space, and then may issue individual requests for each of the corresponding segments to cause them to be downloaded. Next, the player 220 may decode and render video data from the downloaded segments. Similarly, a player 220 may identify desired audio segments from the manifest file 242, issue individual requests for each desired audio segment, decode them, and render them.

The principles of the present disclosure find application with a variety of player devices 220, servers 210, and networks 230. As illustrated in FIG. 2, a player 220 may be embodied in a head-mounted display. Alternatively, players may be embodied in smart phones, tablet computers, laptop computers, personal computers, flat-panel displays, entertainment systems, and/or gaming systems. Thus, for any imaging device capable of playing video, users may identify desired viewports within the played video through user input devices such as a joystick, remote control, or touch screen interface (not shown). Such variants among types of player device are immaterial to the present discussion unless noted otherwise.

Additionally, the principles of the present disclosure may find application with a variety of video source devices 210 including not only servers, as illustrated, but also personal computers, video production systems, and/or gaming platforms. Moreover, media items may be provided either as pre-produced or live content. In a live content implementation, media items may be generated as they are stored. New segments 244 may be input to the server 210 as they are generated, and manifest files 242 may be updated as the new segments 244 are added. In some implementations, a server 210 may buffer video of a predetermined duration of the live media item, for example, 3 minutes worth of video. Older segments may be removed from the server's buffer 210 as newer segments are added. Segment removal need not occur in all cases, however; older segments may be retained or stored, which allows media content both to be furnished live and to be recorded for later use simultaneously.

Similarly, the network 230 may constitute one or more communication and/or computer networks (not shown individually) that convey data between the server 210 and the player 220. The network 230 may be provided as packet-switched and/or circuit switched communication networks, which may employ wireline and/or wireless communication media. The architecture and topology of the network 230 is immaterial to the present discussion unless noted otherwise.

Figure 4:
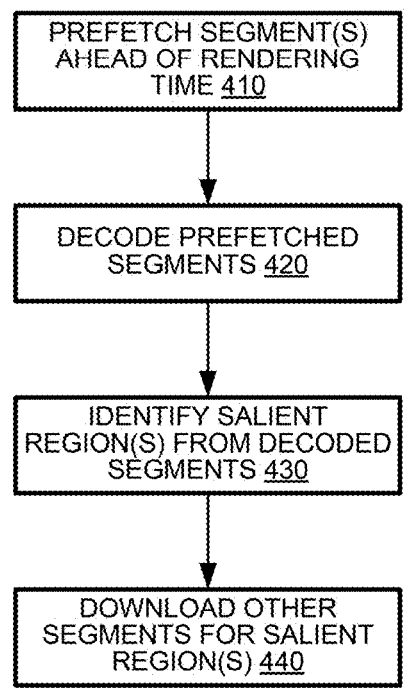
FIG. 4 illustrates a method for viewport prediction according to an aspect of the present disclosure.

FIG. 4 illustrates a method 400 for viewport prediction according to an aspect of the present disclosure. Aspects of the present disclosure may predict player viewports VP by estimating saliency of content within video sequences. In an aspect, a method 400 may prefetch segments of a media item at a time ahead of its rendering time (box 410). The method 400 may decode the prefetched segments (box 420) and may identify salient regions from content of the decoded segment(s) (box 430). The identified salient regions may be used in the prediction of locations of a viewport VP (FIG. 3) within an image space of the multi-view video. Thereafter, the method 400 may download other segments for salient region(s), e.g., other segments containing content about the identified salient region(s) (box 440).

Prefetching, decoding, and salient region identification may be performed in a variety of ways. In one aspect, a player may prefetch the base layer segments 250 (FIG. 2), decode them, and derive saliency distribution from the decoded base layer data. Salient regions may be identified according to object detection, which may detect predetermined types of objects (e.g., human faces, human bodies, or animals.) from within image content. Alternatively, salient regions may be identified from motion analysis, which may identify salient regions as elements of content having motion with distinctive characteristics, for example, motion that differs from global motion of image content within video. Further, salient regions may be identified from foreground/background discrimination techniques from which foreground object(s) may be identified as salient region(s), for example, based on their shape, dimension, or relative location.

It may occur that a player downloads base layer segments of media items to serve other operational policies, such as to protect against network bandwidth variation. In such use cases, once the salient region(s) are identified, the method 400 may download enhancement layer segments for those salient regions.

In another aspect, salient regions may be identified from analysis of audio content. In this case, the method may prefetch and decode audio segments during operation of boxes 410 and 420 and may identify salient regions from the decoded audio content (box 430). Many media items represent audio content with multi-channel audio formats (e.g., stereo audio, spatial audio). Players of multi-view video may model the audio according to the player's orientation within the multi-view image space (FIG. 1), reflecting a 360-degree "soundscape." Such audio content may contain volume changes and signal variation patterns that reflect saliency in the visual content. For example, an audio effect that indicates increasing volume from an upward direction in the image space may indicate that visual content of interest may be found in the upward direction. Thus, a player may identify such effects from the decoded audio, identify the effects directionality, and then download layer segments for tiles in the identified direction.

In other aspects, audio content may often have semantic implication in many applications (e.g., spoken instructions in virtual reality ("VR") touring applications). Speech recognition and natural language processing may be applied to decoded prefetched audio and may be used to align with scene objects for identification of salient regions. In shared VR/augmented reality ("AR") viewing cases (e.g., cinematic VR, gaming, or telepresence.), audio from other viewers/players can serve as indicators of salient regions.

Figure 5:
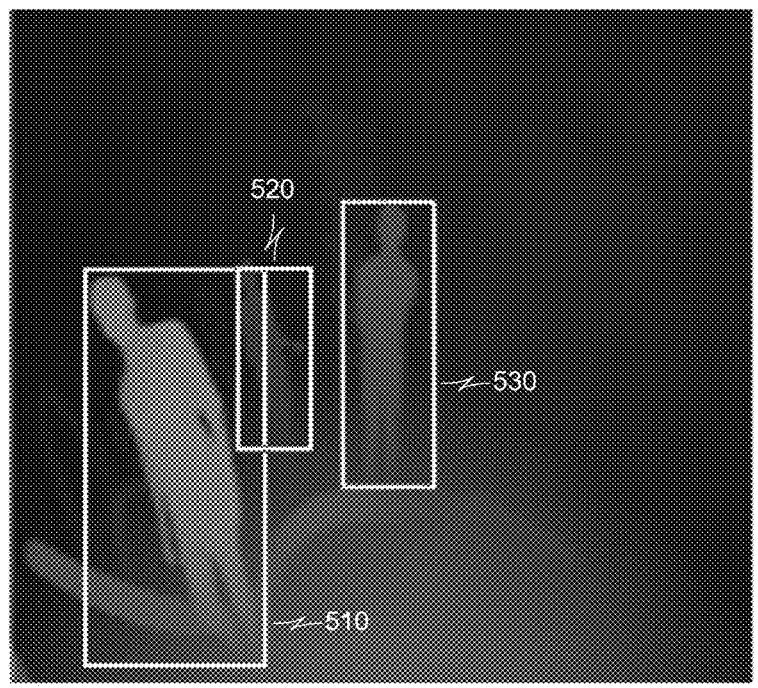
FIG. 5 illustrates foreground detection used by the method of FIG. 4 according to an aspect of the present disclosure.

FIG. 5 illustrates foreground detection used by the method of FIG. 4 according to an aspect of the present disclosure. In an aspect, depth information may be prefetched (box 410) and analyzed to enhance saliency derivation (boxes 420, 430). For example, Three Degrees of Freedom Plus (3DoF+) streaming applications may be used to prefetch depth data. As illustrated in the example of FIG. 5, the method 400 may distinguish foreground content from background content and detect objects 510-530 using depth information. The method may download other segments representing texture data information of the foreground object(s) 510, 520 and/or 530 detected from the depth data.

3DoF+ viewing applications accommodate not only viewport movement based upon player devices' rotational movement—represented by yaw, pitch, and/or roll (FIG. 1)—but also translational movement of such devices—represented by heave, surge, and/or sway (FIG. 1). Translational movement may cause video streaming to switch among multiple "atlas" representations of multi-view video, each corresponding to a particular viewing direction. Aspects of the present disclosure may prefetch content of the salient regions 510, 520 and/or 530 in the other atlas representations. In such an aspect, a player may download base layer representations of the salient regions 510, 520, and/or 530 and, later, download, enhancement layer representations of the salient regions 510, 520, 530 based on later predictions of viewport and atlas locations.

In another aspect involving 6DoF (six degrees of freedom) streaming applications, objects and 3D scenes may be represented in a set of individual three-dimensional (3D) objects having visual attributes such as color, reflectance, texture, and the like. For point cloud applications, the objects may be represented as points in a 3D space having, for example, X, Y, and Z coordinates. In a mesh coding application, the objects in a mesh representation may be represented as connected polygons in a 3D space. Such objects may be represented in media items as objects with increasing levels of detail (LoD), for example as shown in FIG. 6.

Figure 6:
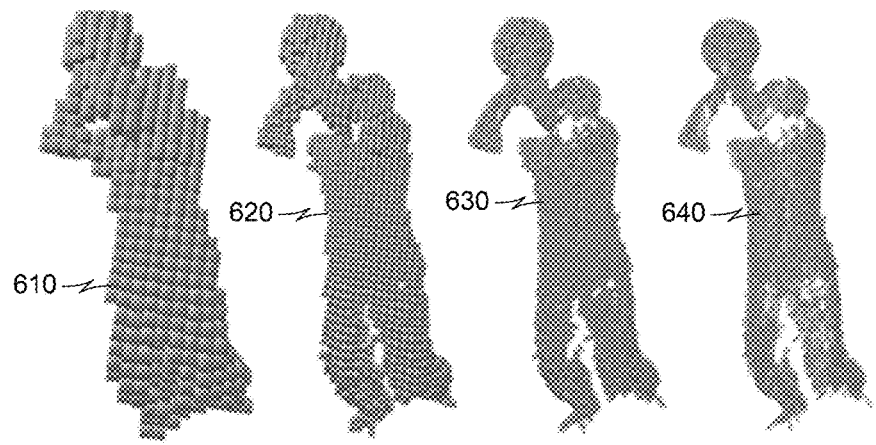
FIG. 6 illustrates point cloud representations of a common object at increasing levels of detail according to an aspect of the present disclosure.

FIG. 6 illustrates point cloud representations 610-640 of a common object 600 at increasing levels of detail. A first representation 610 is a coarse representation of the object in which the object is represented by a first set of points in a three-dimensional space. The representation may identify visual attributes of these points from a particular viewing direction. Additional representations 620-640 may be defined for the object 600 at increasing levels of detail, which may provide higher object point density and associated visual information. In an application, the different representations may be stored at a server 210 (FIG. 2) as individually downloadable segments. Alternatively, the object 600 may be partitioned into different portions (such as partitioning a face of a human subject from the subject's body), and the different portions may be stored at the server 210 as individually-downloadable segments. Although not illustrated in FIG. 6, analogous techniques may be applied to mesh-coded content, with providing increasing levels of visual detail for mesh-coded objects in different segments and, as desired, segmentation between different mesh-coded object types (e.g., subject faces from subject bodies). After predicting a salient region (box 430), a player may retrieve additional refinement levels of the salient region (box 440) to increase the target viewport region content detail and to improve rendering quality.

In the foregoing aspects, a server 210 (FIG. 2) can include descriptive metadata (such as the suggested viewing direction) to guide clients on bitrate and priority selections. For example, the server 210 can send metadata to the client identifying a "recommended" viewport direction for best story-telling (a recommendation may either be provided by content creator or may be summarized based on the voting of other users who have watched or currently watching the same video). Such information may be signaled, for example, using customized supplemental enhancement information (SEI) messages in codecs such as AVC or HEVC or in manifest files 242.

In an aspect, the foregoing techniques may be enhanced by incorporating personalized information about the viewer, such as age group, gender, mood, or demographics. Such information could be extracted from the user's personal devices, such as a smartphone or a smart watch (which may monitor different user's vitals, such as heartbeat and body temperature.). A player may develop a body of view preferences, assembled from viewing habits of previously-viewed content; such viewing history may be applied to establish a viewer profile, containing preferences that may be used for later-viewed content. One viewer, for example, may exhibit viewing habits that demonstrate the viewer prefers to view salient regions with a relative high level of zoom (which causes the salient region to appear larger within a viewport) whereas another viewer may exhibit habits that demonstrate the viewer prefers to view similar regions from a lower level of zoom. In a further aspect, viewer habits may be compared to viewer habits of other viewers when viewing the same content. If a viewer A exhibits view preferences that are similar to a viewer B when reviewing content, then when the viewer A views a new media item 240 (FIG. 2) that viewer B has reviewed, metadata hints may identify salient regions that viewer B selects to a player 220 when presenting the media item 240 to viewer A.

Additionally, a viewer's past viewing behavior over similar or the same content can also be exploited. For example, on a re-watch of a given media item, a player 220 may select new salient regions for download in an effort to present the media item's content from a new perspective, which may retain viewer interest. The past viewing information could be stored at the viewer's local devices for privacy protection. Optimally, a personalized "viewing model" could be created at the client for view prediction reference and this model can be progressively updated as the user gradually watches new contents in different states (e.g., mood, fatigue).

In shared viewing VR/AR streaming applications (e.g., gaming, virtual touring, conferencing, telepresence) where multiple viewers are sharing the virtual environment simultaneously and each viewer can navigate his or her viewing direction independently, salient regions may be identified from behavior of other viewers. For example, if audio communications are available among the viewers, speech analysis may provide semantic information that identifies a salient region as a "suggested viewport" for viewport prediction. The viewer's viewport consistency and relative virtual locations can also be exploited. For instance, if all other users are watching a common object consistently, it is more likely the player's viewer will watch the same object in the future. Therefore, the tiles or patches useful for rendering the object from the current user's viewpoint should be better preserved.

Figure 7:
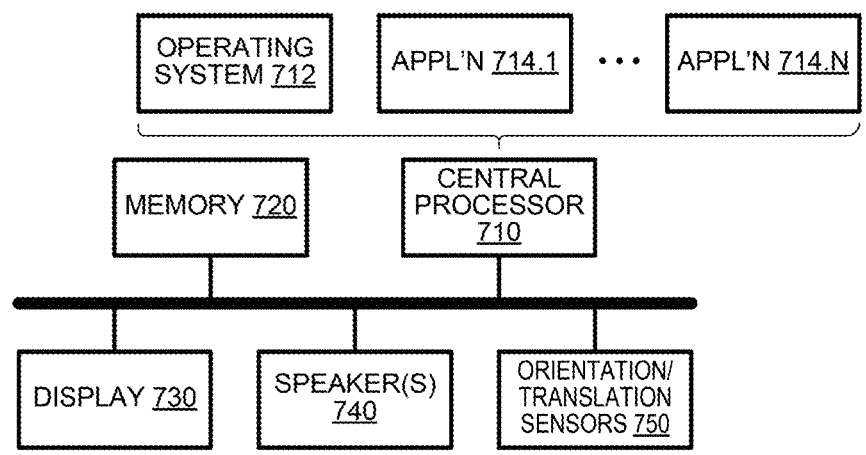
FIG. 7 is a diagram of a processing system according to an aspect of the present disclosure.

FIG. 7 is a diagram of a processing system 700 according to an aspect of the present disclosure. The system 700 may include a central processor 710, a memory system 720, a display 730, one or more speakers 740 and various sensors 750. The processor 710 may execute program instructions, stored in the memory 720, that define an operating system 712 of the system 700 and one or more application programs 714.1-714.N. The display 730 may render decoded video of a viewport that corresponds to an orientation of the system 700 in the image space (FIG. 1) and the speaker(s) may render decoded audio of the media item. The sensors 750 may provide data from which the central processor 710 may estimate the system's 700 orientation in the image space.

Operational features disclosed hereinabove (e.g., FIGS. 2-6) may be embodied in program instructions that are stored by the memory system 720 and executed by the central processor 710. These program instructions may be embodied as part of the operating system 712 or an application 714.1 as may be convenient.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A streaming method, comprising:
   prefetching a portion of content of a multi-view media item,
   identifying, from a first mesh representation of the multi-view media item, a salient region, and
   downloading additional content of the multi-view media item corresponding to the identified salient region,
   wherein the additional content is a second mesh representation of the multi-view media item at a higher level of detail than the first mesh representation.

2. The method of claim 1, wherein the identifying includes identifying a salient region from metadata included with the prefetched portion of the content.

3. The method of claim 1, wherein the identifying salient region(s) is performed with reference to a profile of viewing preferences.

4. The method of claim 1, wherein the identifying salient region(s) is performed with reference to personalized information of a viewer.

* * * * *